United States Patent [19]
Goodno

[11] Patent Number: 5,262,121
[45] Date of Patent: Nov. 16, 1993

[54] METHOD OF MAKING AND USING FLEXIBLE MANDREL

[76] Inventor: Kenneth T. Goodno, 31232 - 28th Ave. S., Federal Way, Wash. 98003

[21] Appl. No.: 809,757

[22] Filed: Dec. 18, 1991

[51] Int. Cl.⁵ .............................................. B29C 33/40
[52] U.S. Cl. .................................. 264/571; 156/156; 156/173; 156/304.2; 264/225; 264/248; 264/257; 264/313
[58] Field of Search .............. 264/220, 225, 257, 258, 264/313, 314, 511, 512, 571, 248, 101; 156/156, 173, 175, 228, 304.2; 249/65

[56] References Cited

U.S. PATENT DOCUMENTS

| | | | |
|---|---|---|---|
| 1,146,523 | 7/1915 | Roberts | 156/228 |
| 1,974,337 | 9/1934 | Magnani | 156/304.2 |
| 2,003,232 | 5/1935 | Benge | 156/196 |
| 2,488,922 | 11/1949 | Mead | 264/571 |
| 2,499,324 | 2/1950 | Mead | 264/220 |
| 2,513,785 | 7/1950 | Browne | 264/220 |
| 2,517,902 | 8/1950 | Luebkeman | 264/225 |
| 2,865,079 | 12/1958 | Marchioli et al. | 264/314 |
| 2,995,781 | 8/1961 | Sipler | 156/228 |
| 3,135,640 | 6/1964 | Kepka et al. | 264/45.2 |
| 3,629,030 | 12/1971 | Ash | 156/189 |
| 3,891,022 | 6/1975 | Cola | 164/41 |
| 3,962,394 | 6/1976 | Hall | 264/313 |
| 4,045,830 | 9/1977 | Loeb et al. | 5/81 |
| 4,126,659 | 11/1978 | Blad | 264/90 |
| 4,883,550 | 11/1989 | Overath et al. | 264/512 |
| 4,946,369 | 8/1990 | Beck et al. | 427/133 |
| 5,051,226 | 9/1991 | Brustad et al. | 264/511 |
| 5,059,377 | 10/1991 | Ashton et al. | 264/313 |

FOREIGN PATENT DOCUMENTS 1-184124  7/1989  Japan ................... 264/314

OTHER PUBLICATIONS 2 catalog sheets labeled "Macrolite" (trademark) Ceramic Spheres, Product Information and Preliminary Data Sheet, by the Industrial Mineral Products Division of 3M, 612/733 0350, 800/255 1402.

*Primary Examiner*—Jay H. Woo
*Assistant Examiner*—Robert B. Davis
*Attorney, Agent, or Firm*—Glenn D. Bellamy

[57] ABSTRACT

The invention provides a method of making an elastomeric mandrel for use in formation of parts from composite materials. The method of making includes providing a separable mold with an interior chamber shaped to provide a desired exterior mandrel size and shape; applying uncured elastomeric material to surfaces of the interior chamber of separated parts of the mold; joining the elastomeric material by assembling the mold parts prior to cure such that the material joins at seams and allowing the elastomeric material to cure into a shape of the desired flexible mandrel. The mandrel is provided with a fill opening such that it is fillable with a particulate solid media and evacuable to compact the media. The invention also provides a method of using a flexible mandrel including the steps of providing a hollow elastomeric mandrel with a predetermined exterior size and shape, a fill opening, and an evacuation port and providing a separable mold having an interior cavity surface sized and shaped to correspond to a desired exterior size and shape of the mandrel in use. The mandrel is placed into the mold and an external vacuum is provided within the mold to draw the mandrel snugly against the mold's interior cavity surface. The mandrel is then filled with a particulate solid media through the fill opening and an internal vacuum is provided within the mandrel through the evacuation port to compact said media into a substantially rigid form. The external vacuum is then released while maintaining the internal vacuum and the mandrel is removed from the mold for use.

21 Claims, 5 Drawing Sheets

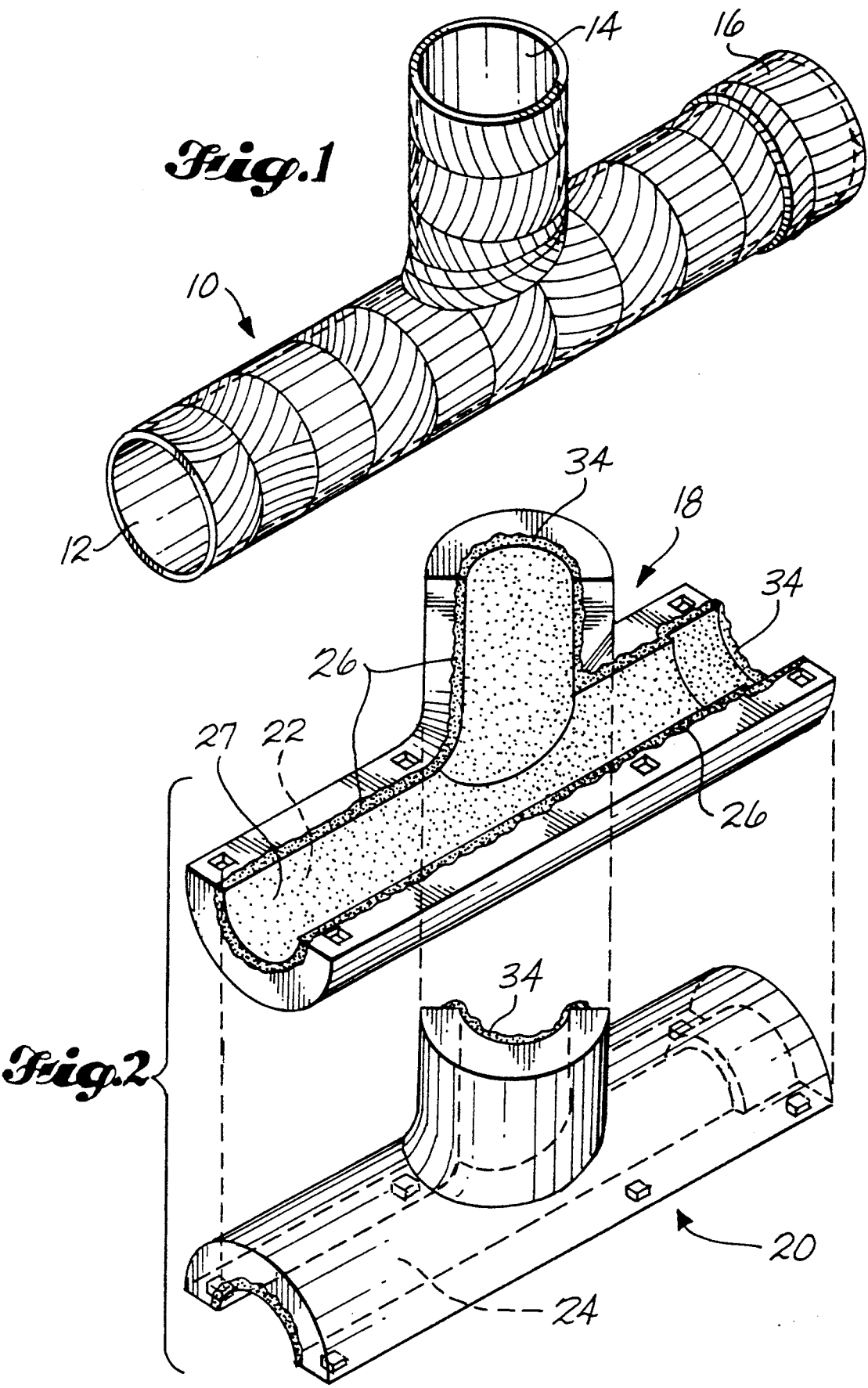

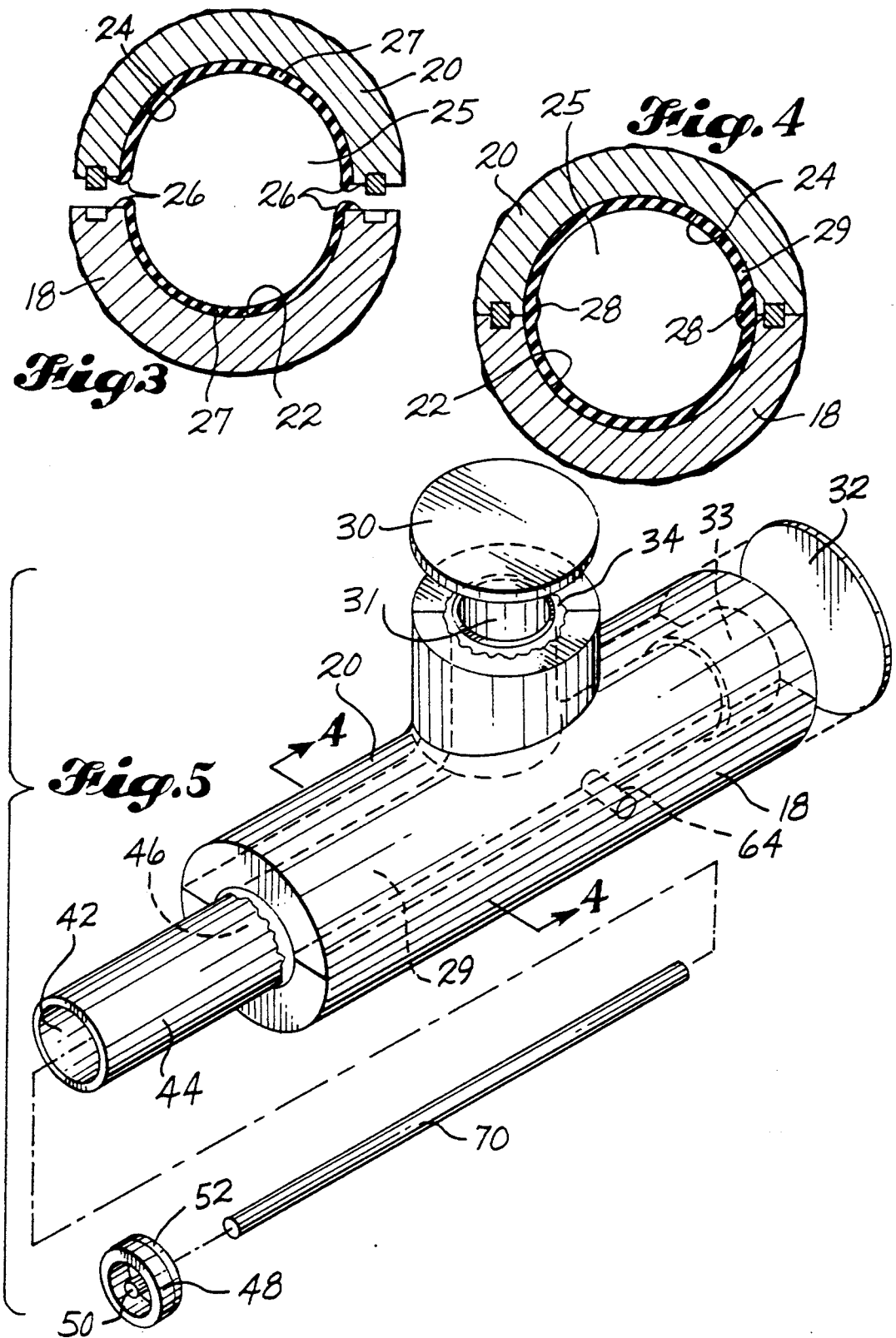

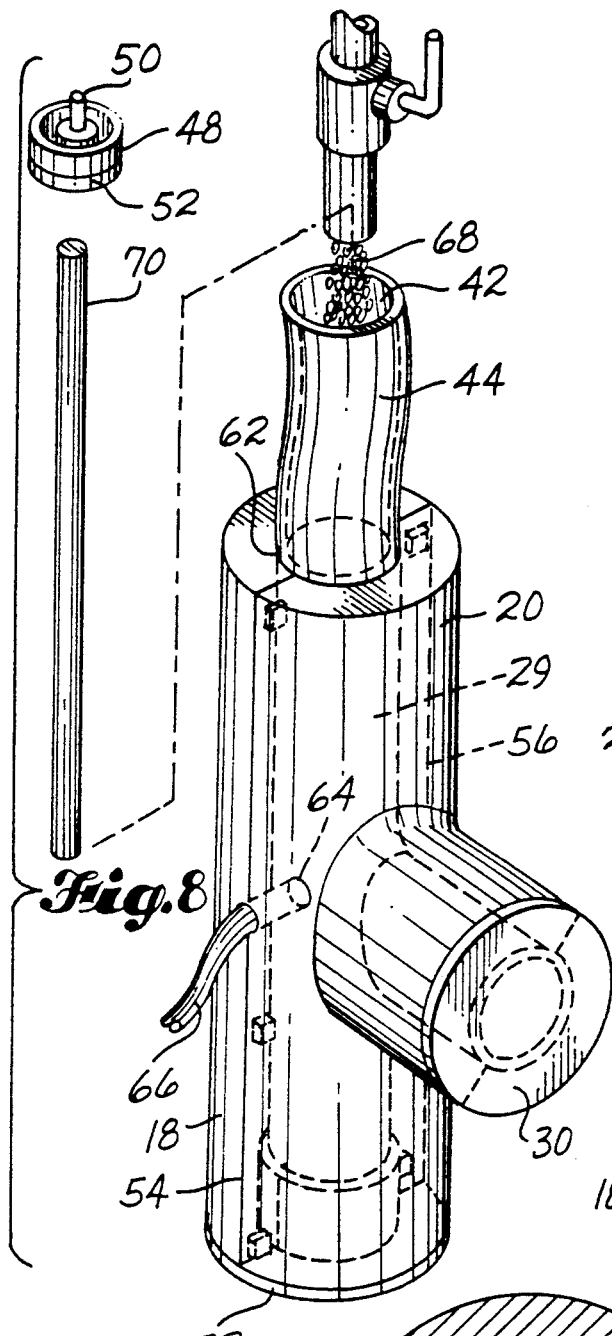
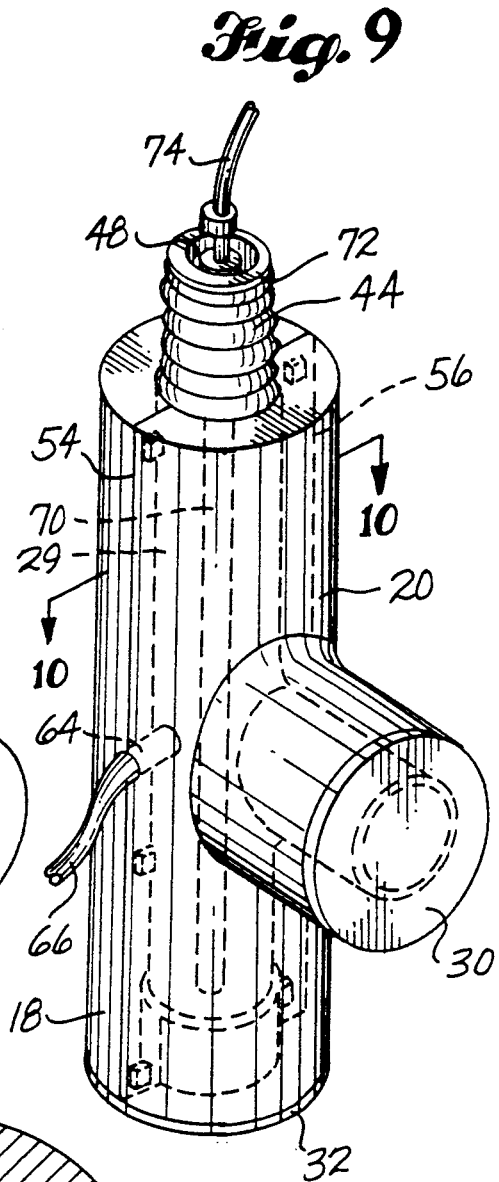
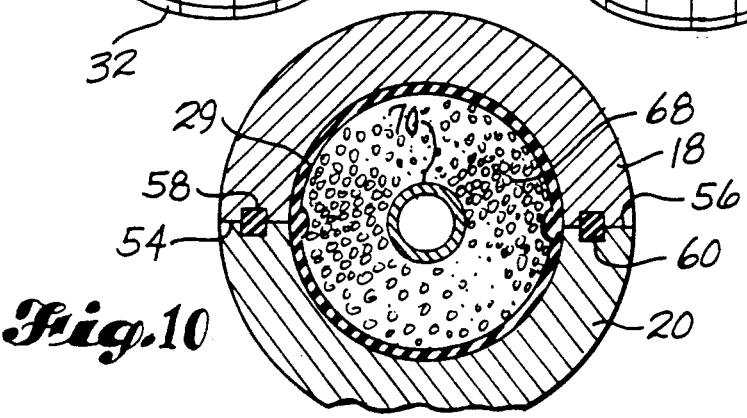

METHOD OF MAKING AND USING FLEXIBLE MANDREL

DESCRIPTION

1. Technical Field

This invention relates to a method of making and using a re-usable flexible mandrel which can be made rigid according to the present method for use as a tool for formation of composite parts.

2. Background Art

Composite materials comprising a fiber-reinforced resin matrix are often used to form lightweight, high strength parts. One ideal use of these materials is for fabrication of structural or non-structural aircraft parts, especially environmental control system ducts.

Fabrication of environmental control system duct parts made of composite materials typically includes formation of a mandrel having an exterior shape generally conforming to the desired interior shape of the duct part. Uncured composite materials are then laid up on the mandrel and cured by applying heat and pressure according to well-known methods. Present industry practice is to form expendable mandrels from plaster or water soluble eutectic salts. After the composite part has been cured, the plaster mandrel is removed by breaking it away from the part using impact devices. The broken plaster pieces are then discarded at significant cost to the manufacturer.

The majority of such mandrels are fabricated using multi-piece slosh molds which are constructed to conform to the internal shape of the desired part or duct. Slosh molding of mandrels includes the introduction of a slurry of plaster to the interior of the mold. The mold is then kept in motion by rotating and rolling to allow the slurry of plaster to coat the interior of the mold to a desirable uniform thickness. The plaster is allowed to set and is then removed from the mold. Seam lines, flash and defects are removed or repaired. The plaster mandrel is then dried in an air-circulating oven and is coated with a sealing paint which is required due to the porous nature of plaster. Such sealing paints are typically toxic, volatile, and require the use of special precautions to avoid health risks to workers. Because each plaster mandrel must be sufficiently breakable to be removed from within the cured composite part without destroying the part, it is not uncommon that these fragile mandrels are broken prior to or during use.

After the plaster mandrel is laid up with the composite material and the material is cured in an oven or otherwise, the finished composite part is separated from the mandrel by breaking away the plaster from within the part. This creates a very dusty workplace environment and it is not uncommon that this causes damage to the part which must be repaired. Due to the inherently porous nature and moisture content of the plaster mandrel, the finished part is typically resin sloshed internally to seal and provide a smoother finished surface.

This use of breakaway plaster or eutectic salt mandrels is labor intensive, can result in irreparable damage to cured composite parts, and produces large quantities of waste product which is costly to dispose of and may be environmentally suspect. A small percentage of eutectic salts may be recoverable, but is not cost effective in most cases due to contamination.

Expandable elastomeric mandrels have been used previously in other types of composite part fabrication. One such process is the use of an expandable mandrel where pressure is applied to the interior of the mandrel and expanded to force uncured composite material to conform to an interior mold surface of the external part configuration. These mandrels are limited to simple design configurations in which the internal surfaces of the part are not critical.

An object of the present invention is to provide a reusable mandrel for forming internally-sized parts, such as ducting, which can be made at a reasonable cost, can be reused many times, produces higher quality composite material products, and produces no waste product for disposal.

SUMMARY OF THE INVENTION

The present invention provides a method of making and using a flexible mandrel for use in formation of parts from composite materials. The method of making the flexible mandrel includes the steps of providing a separable mold with an interior chamber shaped to provide a desired exterior mandrel size and shape and applying uncured elastomeric material to surfaces of the interior chamber of separated parts of the mold. The elastomeric material is joined by assembling the mold parts prior to curing such that the material joins at seams. The elastomeric material is allowed to cure into a shape of the desired flexible mandrel. A fill opening is provided such that the mandrel is fillable with a flowable particulate solid material and evacuable to compact the particulate material.

The flexible mandrel may also include an internal elongated rigid reinforcement means for providing increased longitudinal rigidity and displacing a portion of the fill media. In preferred form, the flexible mandrel is formed of a sprayable silicone rubber material and includes flange means for sealing the mandrel at mold openings.

The mandrel may also include a combined closure member and evacuation port which is used to close the fill opening and to provide an internal vacuum on the mandrel. A reservoir may be provided which is operably connected with the mandrel so that fill media may be moved between the reservoir and the mandrel without risk of spillage and without repeated measurement of optimal fill media volume.

The method of using a flexible mandrel includes the steps of providing a hollow elastomeric mandrel with a predetermined exterior size and shape and with a fill opening and an evacuation port. The mandrel is placed in a mold having an interior cavity surface sized and shaped to correspond to a desired exterior size and shape of the mandrel in use. An external vacuum is provided within the mold to draw the mandrel snugly against the mold's interior surface. The mandrel is then filled with a flowable particulate solid material through the fill opening and an internal vacuum is provided within the mandrel to compact the particulate material into a substantially rigid form. The external vacuum is released while maintaining the internal vacuum, and the mandrel is removed from the mold for use.

The mandrel may be used by applying uncured composite material on it and curing the composite material in place on the mandrel. The mandrel may be separated from the cured composite part by removing the internal vacuum and displacing at least a portion of the fill media, preferably into an attached reservoir.

In preferred form, the fill media is preliminarily compacted by vibrating or shaking the media prior to applying the internal vacuum. If desired, an elongated rigid reinforcement means may be provided within the mandrel such that it displaces a portion of the fill media and provides increased longitudinal rigidity. Existing molds may be modified for use according to the invention by providing an elastomeric seal means between the mold parts and/or by providing seal flanges on the mandrel at openings of the mold.

BRIEF DESCRIPTION OF THE DRAWINGS

Like reference numerals are used to indicate like parts throughout the various figures of the drawing, wherein:

FIG. 1 is a pictorial view of a fiber-reinforced resin matrix composite material part made according to the present invention;

FIG. 2 is a mold separated into two parts in which an elastomeric mandrel according to the present invention is formed;

FIG. 3 is a sectional view of a mold to which uncured elastomeric material has been applied for making a flexible mandrel;

FIG. 4 is a sectional view taken substantially along lines 4—4 of FIG. 5, showing separate parts of a flexible mandrel bonded together to cure within the mold;

FIG. 5 is an exploded pictorial view of a flexible mandrel apparatus being made according to the method of the present invention;

FIG. 8 is an exploded pictorial view of a flexible mandrel being filled according to a preferred method of the present invention;

FIG. 9 is a pictorial view showing the flexible mandrel being evacuated and rigidified into shape according to the preferred method of the present invention;

FIG. 10 is a partial sectional view taken substantially along line 10—10 of FIG. 9 showing the filled and evacuated mandrel being shaped according to the preferred method of the present invention;

BEST MODE FOR CARRYING OUT THE INVENTION

Figure 6:
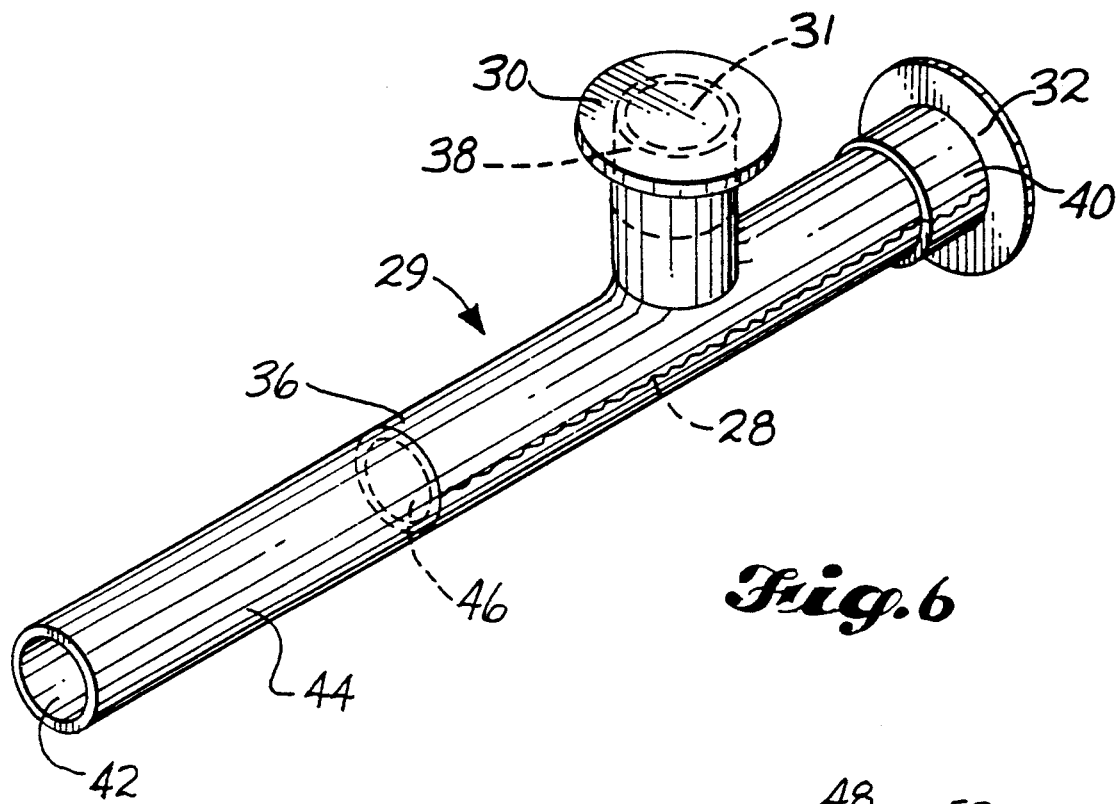
FIG. 6 is a pictorial view of a flexible mandrel constructed according to the method of the present invention and for use according to the method of the present invention.

Referring to the various figures of the drawing, and first to FIG. 1, therein is shown at 10 a typical fiber-reinforced resin matrix composite material part in the form of a ventilation duct which may commonly be used on commercial airplanes. In a typical part of this nature, as shown, the critical dimensioning and surface area is the interior of the hollow part. The part shown includes three branches 12, 14, 16, the latter including a connector sleeve dimensioned to receive an end portion of an adjoining duct part.

In an uncured or semi-cured state, most composite materials are relatively flexible. Typically, parts are formed by providing a rigid mandrel onto which the composite material is "built up" or layered into a desired shape. The composite materials may be built up by alternating layers of resins and fibrous sheets, or by applying layers of resin-impregnated fibrous sheets, often referred to as "prepreg." Alternatively, fibers may be wound onto a mandrel in conjunction with the application of resins.

After being laid up on a form, the composite materials are cured by subjecting them to a combination of heat and pressure. Upon being heated, the resinous material initially becomes more fluid and flows to homogeneously surround the reinforcing fibers. Compression of the composite materials as they are curing forces out gas bubbles which may exist in the material and which could create structural flaws. The combination of heat and pressure facilitates cross-linking of the resinous compounds to create a strong, consolidated material.

Previously, mandrels have been made from plaster or water-soluble eutectic salts. Typically, these are fabricated using multi-piece slosh molds which are constructed to conform to the internal shape of the desired part or duct. The re-usable flexible mandrel and method for its use of the present invention can make use of existing molds with only minor modifications or attachments.

METHOD OF MAKING FLEXIBLE MANDREL

Referring to FIG. 2, therein is shown at 18 and 20 a separable mold of common construction typically used for slosh molding of plaster or eutectic salt mandrels. These molds may be made from, for example, a fiberglass/epoxy composite. For use according to the method of the present invention, the illustrated mold 18, 20 need only be separable into two main pieces. Such a mold for use in forming the more delicate plaster or eutectic salt mandrels of the illustrated shape would typically be separable into four or more pieces. The number of pieces in any given mold will depend upon the shape, size and configuration of the mandrel being formed. However, formation of a flexible mandrel according to the present invention will typically require the mold to be separable into significantly fewer parts than when used to form rigid mandrels. In any event, when the mold parts 18, 20 are assembled, interior surfaces 22, 24 create a chamber 25 which is shaped to provide a desired exterior mandrel size and shape. The flexible mandrel of the present invention is formed on the interior surfaces 22, 24 of the mold parts 18, 20 which are later assembled to form a unitary, hollow elastomeric mandrel. Existing molds for use in slosh molding plaster mandrels can be used with the method of the present invention with only very minor modification, as explained later.

In preferred form, the mandrel is made from an elastomeric material, such as a silicone rubber compound. The preferred material is a sprayable, thixotropic silicone designed for use in making seamless spray-on external conformal vacuum bags and is sold under the trade names "DAPCO 63" and "DAPCOCAST 62 HT", by D Aircraft Products, Inc., a subsidiary of American Cyanamid, of Anaheim, CA. This material is sprayable when diluted with solvents according to the manufacturer's specifications and, when properly cured, is very durable, flexible, stable, and heat-resistant.

This material 27 can be painted or, preferably, sprayed onto interior surfaces 22, 24 of the mold parts 18, 20, as shown in FIG. 2. Typically, the silicone material 27 is sprayed in multiple layers, allowing air curing between coats. The above-described preferred material is self-bonding to like material. Each layer 27 is applied at a preferred thickness of approximately 0.007 to 0.012 inch. Overspray or flash areas 26 are wiped away immediately to prevent excess buildup of flash between each coat. A final thickness of 0.050 to 0.090 inches is preferred. A sufficient number of coats should be applied to provide the desired thickness, allowing at least a partial air cure between coats (15–30 minutes). If deemed necessary, points of increased stress or wear could be thickened.

On the final coat, a narrow band of overspray or flash 26 should be allowed to remain. This is illustrated in a somewhat exaggerated manner in FIG. 3. While this portion of the compound is still uncured, the mold halves 18, 20 are assembled and tightly held together. This step of assembly in the formation of the mandrel is represented in FIG. 4. This will create an integral bond of the material and form joining seams 28.

Referring to FIG. 6, the joined-together elastomeric mandrel 29 is allowed a suitable low temperature air cure before removal from the mold for a free-standing post cure. A heated post cure in accordance with the silicone compound manufacturer's recommendations is preferred.

Depending upon the configuration or the tool design, ends 31, 33 which are normally open are capped or sealed to contain the media which will later be used to fill and hold the mandrel's shape during use. Referring to FIG. 5, according to a preferred method which allows an existing slosh mold 18, 20 to be adapted for use with the present invention, cap pieces 30, 32 are attached to the open ends 31, 33. The end caps 30, 32 can be out from a sheet of material, such as cured silicone, having physical properties consistent with the material used to construct the body of the mandrel 29. A suitable sheet of material can be made by spraying a suitable thickness on a flat surface, then removing and cutting to shape to form the end caps 30, 32. The caps 30, 32 can be attached after the mandrel 29 has air cured and has been removed from the mold 18, 20, using uncured silicone compound as an adhesive. Or, the cap pieces 30, 32 may be attached immediately after the mold halves 18, 20 are assembled together. If done this way, a narrow ring of uncured flash 34 may be allowed to remain around the perimeter of the open ends 31, 33, which will form an integral seam with the end caps 30, 32.

Alternatively, blind ends could be provided in the mandrel 29 by constructing a special mold (not shown) which would provide flat or rounded end closures for the mandrel which extend beyond its used areas.

As will be discussed in greater detail below with respect to the manner in which the mandrel of the present invention is laid up with composite materials when used, the mandrel 29 is sized to extend slightly beyond the finished trim length of the composite part. These areas, for example, can be seen at 36, 38, 40 in FIG. 6. In accordance with the present invention, a fill opening 42, 46 is provided for the introduction of fill media into the flexible mandrel 29. This should normally be provided at an end 42, 46 which would otherwise be left open.

In preferred form, an extension sleeve 44 is added to the opening 46 for the purposes of providing a funnel and closure clamping area to the opening 46 and also providing an enclosed area into which media may be shifted during removal of the mandrel 29 from a cured composite part 10, as Will be explained further below.

The extension sleeve 44 can be made from a sheet or tube of silicone rubber material similar to that used to form the mandrel 29 itself. The sleeve 44 is attached to the perimeter of the opening 46 using silicone adhesive. Alternatively, if a special mold is provided, the extension sleeve portion 44 can be manufactured integrally with the mandrel body. However, due to the relatively high cost of producing mold parts, and the desirability of using existing mold parts with only slight modification, the former method is preferred at this time by the inventors.

This flexible elastomeric mandrel 29 of this invention can be used and re-used according to the later-described method. The elastomeric material of the mandrel 29 is readily repairable in the unlikely event that it becomes damaged during use. Because the silicone compound conforms to the interior surfaces 22, 24 of the mold 18, 20 to form a virtually perfect mirror image, this elastomeric mandrel 29 will consistently produce uniform composite parts. Also, because the elastomeric material is smooth and non-porous, no sealing agent or paint is required on the mandrel.

Figure 7:
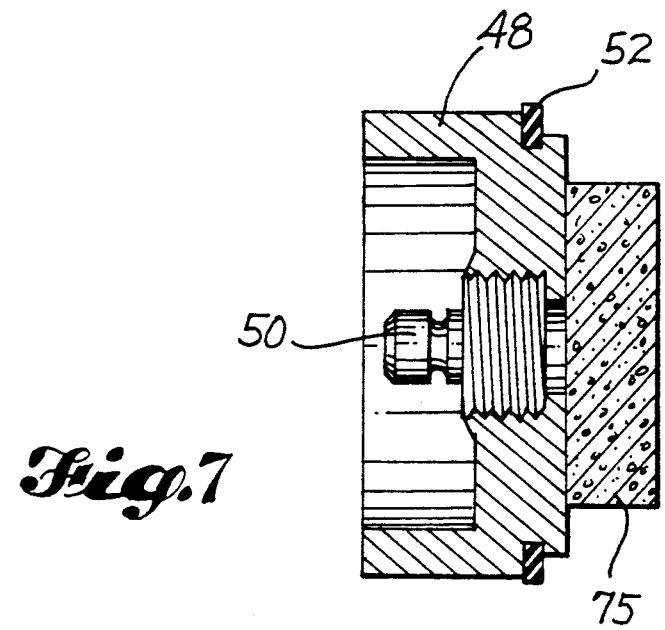
FIG. 7 is a partially-sectioned view of a fill opening plug with an evacuation port.

Referring to FIGS. 5 and 7, a closure cap 48 having a check valve evacuation port 50 is provided and sized to approximate the size of the fill opening 42. The plug 48 may be machined from aluminum or other appropriate material. The vacuum port 50 is provided with a quick-release fitting and internal check valve of well-known construction. An annular gasket or O-ring type seal 52 is provided on the plug 48 to assure an airtight seal of the plug 48 in the fill opening 42 of the extension sleeve 44. The fill opening 42 and evacuation port 50 may be placed at different locations on the mandrel 29, although a shared location is preferred.

METHOD OF USING FLEXIBLE MANDREL

The above-described flexible mandrel 29 can be used according to the following method to produce uniform, high quality parts from composite materials without repeated consumption of materials and without production of waste product. In use, the flexible, elastomeric mandrel 29 must be made to rigidly take on a desired tooling shape for layup with uncured composite materials. For the purpose of illustration, the same part shape illustrated in FIG. 1 and described above will be used to illustrate use of the flexible mandrel 29 in FIGS. 8–13.

A mold 18, 20 having an interior cavity surface sized and shaped to correspond to a desired exterior size and shape of the mandrel in use is provided. In preferred form, this mold 18, 20 is the same mold which was used to produce the flexible mandrel 29 according to the above-described method and the same mold which may have been used previously for the construction of consumable plaster mandrels.

The prepared flexible mandrel 29 is placed in the interior cavity 25 of the mold 18, 20. The mold parts 18, 20 are tightly joined or clamped together and vacuum pressure is applied to the interior cavity 25 of the mold 18, 20, exterior of the mandrel body 29. In order to facilitate the formation of a vacuum within the mold 18, 20, it is necessary to seal the joints 54, 56 of the mold parts 18, 20 as well as to seal around the junction of the end cap pieces 30, 32 of the mandrel 29 with the mold parts 18, 20. This may be accomplished by using commonly available vacuum grease, or the like, and/or modifying the mold parts 18, 20 to include an integral, elastomeric gasket or seal 58, 60. The opening 62 through which the extension sleeve 44 projects must also be sealed, such as with common vacuum grease, or the like.

Alternatively, if a specialized mold is used rather than the preferred adaptation of an existing mold 18, 20, the flexible mandrel 29 itself may be provided with annular gaskets, flanges or seal ridges (not shown) at its extremities which are constructed to fit within annular grooves in the specialized mold. In this manner, the flexible mandrel may be substantially self-sealing within such a specialized mold. In the event that a specialized mold using blind ends is used, the need to seal such openings is eliminated. Instead, it would remain necessary only to seal the mold parts together, such as with the above-described elastomeric gasket or O-ring type seal, and to seal the opening 62 at the extension sleeve 44. In such a situation, an elastomeric flange (not shown) could be provided around the junction between the extension sleeve 44 and the mandrel body 29. In any event, the above-described seal ridges would not interfere with use of the mandrel 29, as any such members would be located in areas (such as at 36, 38, 40) which are not used for composite part layup.

Vacuum pressure external of the mandrel 29 to draw it tightly against the inner surfaces 22, 24 of the mold parts 18, 20 may be applied by placing the entire mold within a standard flexible vacuum bag or by adapting the mold to include a vacuum probe. This may be accomplished simply by providing a small channel 64 at a seam line 54 of the mold between the internal cavity 25 and the exterior. A vacuum line 66 or probe may be sealed within the channel 64 to apply a vacuum to the interior of the mold.

Vacuum pressure of approximately 25 pounds per square inch is commonly available in facilities set up to manufacture composite material parts and is adequate to tightly draw the flexible mandrel 29 against the interior surfaces 22, 24 of the mold. If the shape of the mandrel and corresponding part to be formed is very complex or irregular, it could be necessary to provide minute scribe lines on interior surfaces of the mold in order to assure that the vacuum is complete and no air pockets remain trapped at any position between the wall of the mandrel 29 and the interior surface of the mold. This, however, is expected to be necessary only in relatively isolated situations.

Because the mandrel body 29 is drawn by vacuum pressure tightly against the interior surfaces 22, 24 of the mold, any shrinkage of the elastomeric material through repeated use or post-cure heating will not effect its performance or ability to repeatedly produce uniform parts. In some situations, especially where the opening of the cured composite part through which the mandrel will be removed is very small, the elastomeric mandrel may be intentionally made to be undersized and then stretched by the external vacuum pressure 66 into a desired working size and shape. For this reason, the desired predetermined exterior size and shape of the elastomeric mandrel is not necessarily exactly the desired size and shape of the mandrel in use.

Once the above-described exterior vacuum pressure 66 is applied between the mold and flexible mandrel, fill media 68 is introduced to the interior of the mandrel 29 along with any reinforcements 70 deemed necessary. The fill media 68 may be any solid, flowable particulate material, such as sand or commonly-available ceramic beads. A preferred media of ceramic spheres is sold under the trade name "MACROLITE" by the 3M Company of St. Paul, Mn. This material is very heat stable and is available in a variety of size ranges. The particle size of the media will depend upon the complexity of the part being formed and the wall thickness of the elastomeric mandrel. The more complex the part or thinner the mandrel wall, the finer the desired media. MACROLITE ceramic spheres are available in sizes ranging from 0.01 to 0.50 inches in diameter. The preferred size range for use with the above-described elastomeric mandrel are beads in the 0.02 to 0.11 inches range. While commonly available silica sand is perfectly adequate, its bulk density is approximately five times that of the MACROLITE ceramic spheres and, therefore, can be undesirably heavy for use in large mandrels.

The choice of media used could also be based upon a desire to make the mandrel more or less thermally conductive or thermally damping. The rate at which the mandrel conducts or retains heat can affect the quality of the composite materials when some curing methods are used.

Extremely long or thin shapes may be aided by use of an internal reinforcement member 70 which is sized and shaped to extend substantially along an axial length of the mandrel in use. In preferred form, this reinforcement 70 is a rigid, hollow tube. The reinforcement 70 serves the dual function of providing longitudinal stiffness to the mandrel and displacing some volume of fill media 68, thereby reducing overall weight. The reinforcement 70 may be allowed to "float" along approximately the longitudinal axis of the mandrel 29, or could be attached to one or more end caps 48. The reinforcement 70 could be made to extend outwardly of the mandrel 29, either through an end cap 48 or otherwise to facilitate handling of the mandrel during layup or supporting the mandrel during a cure cycle.

Once filled, the media 68 is then compacted within the mandrel 29 by shaking or vibrating the entire assembly. This may be accomplished by hand or by use of commonly available industrial vibrators. After compaction, the mandrel 29 should be full to its juncture with the extension sleeve portion 44, or at least beyond the area which is used for composite material layup. Referring now to FIG. 9, the end plug 48 is sealed into the end opening 42 by a band clamp 72 and a vacuum source 74 is coupled (at 50) to the end cap 48. As air is evacuated from the interior of the mandrel 29, the extension portion 44 will collapse and the media 68 will be further compacted by removal of interparticulate air. The interior vacuum pressure 74 applied should be equal to or less than the external vacuum pressure 66. An appropriate screen or similar device should be used to prevent the evacuation of media 68 by the vacuum source 74. A simple fabric filter can be used, or a porous ceramic-type filter 75 may be attached to the end of the vacuum probe or end cap 48. Although not necessary for favorable results, the above-described end cap 48, vacuum filter 75 and reinforcement 70 could be combined such that vacuum pressure is drawn through the reinforcement to along substantially the entire length of the mandrel.

The vacuum pressure applied to the media-filled elastomeric mandrel 29 causes it to become very rigid and prevents shifting of the media 68 within the mandrel body 29. The external vacuum 66 can then be removed and the mandrel 29 can be removed from the mold 18, 20 with internal vacuum pressure 74 being maintained either actively or by check valve. When the mandrel 29 is removed from the mold 18, 20, it will rigidly retain its shape so long as the internal vacuum is maintained.

The mandrel 29 may then be prepared for layup with composite material. In preferred use, parting agents are applied to the silicone mandrel prior to layup. A preferred parting agent is sold under the trade name "FREKOTE 700", which is a parting agent commonly used with expendable plaster mandrels after treatment with sealing paint. Because the silicone material is non-porous, no sealing agent is required on the elastomeric mandrel 29.

Figure 11:
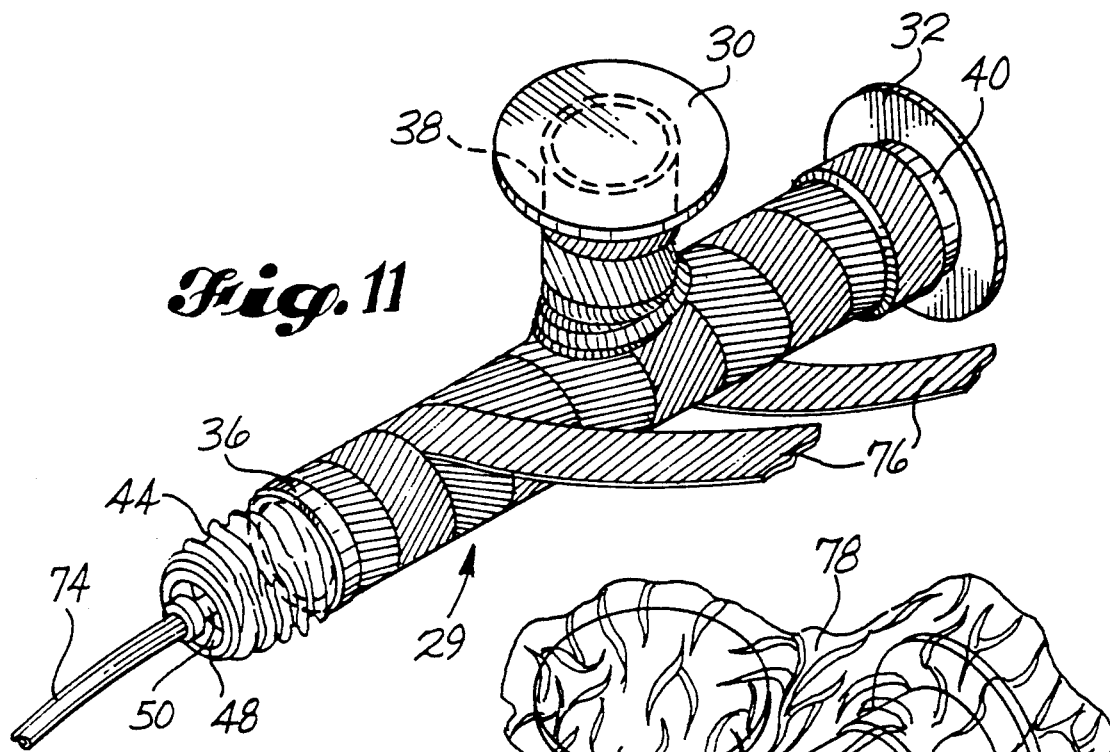
FIG. 11 is a pictorial view showing the prepared mandrel being laid up with uncured composite material.

Referring to FIG. 11, composite materials such as prepreg are applied to the mandrel 29 in the same manner as the materials would be applied to an expendable plaster or other mandrel. Prepreg or other fibrous sheets may be layered, wrapped, or wound onto the mandrel 29 according to any desired well-known assembly method. The method of layup of the composite material does not constitute a part of the present invention.

Figure 12:
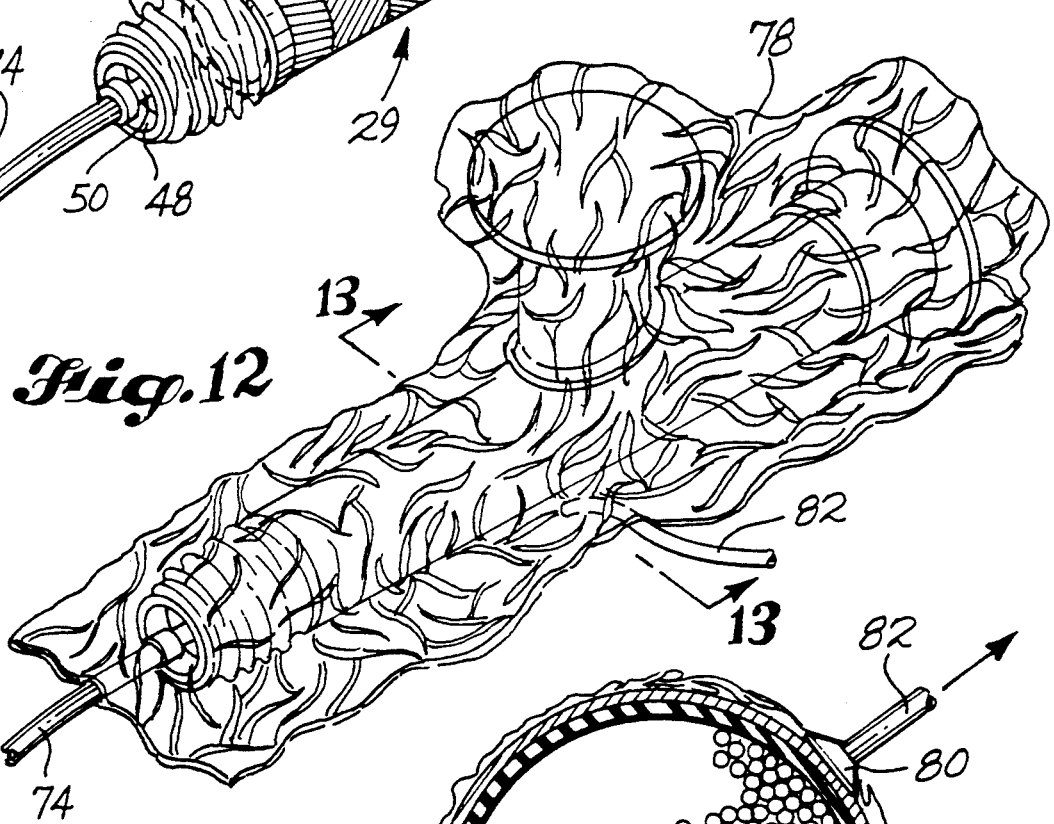
FIG. 12 is a view similar to FIG. 11, showing the part and mandrel vacuum bagged for heat and pressure curing.
Figure 13:
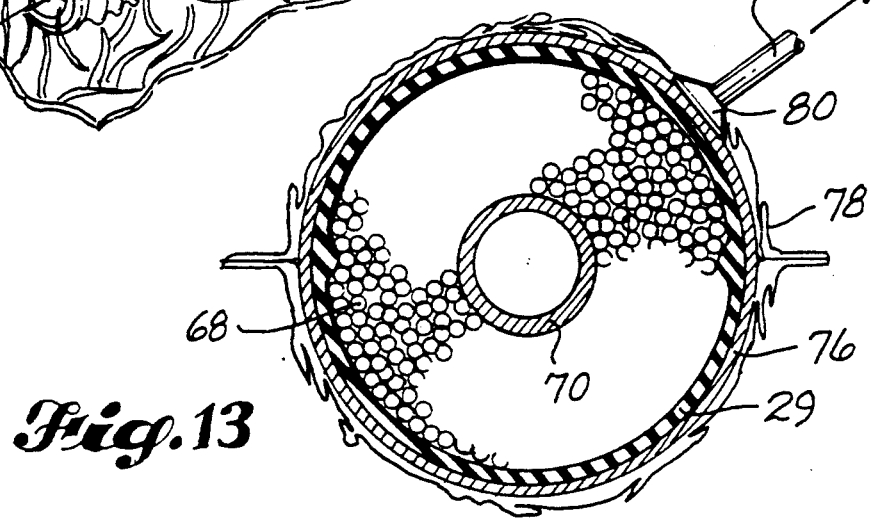
FIG. 13 is a sectional view taken substantially along line 13—13 of FIG. 12. showing the composite material part prepared for curing on the rigidified elastomeric mandrel.

Once the composite material 76 has been laid up on the mandrel 29, the part is prepared for heat and pressure curing, as generally shown in FIGS. 12 and 13. Accordingly to commonly-known methods, a TEFLON (trademark) film and/or heat-activated shrink tape is applied over the laid-up composite material 76. The TEFLON film is readily available and is substantially inert to the composite materials 76 and, therefore, resistant to sticking or HP LaserJet+, 500+HPLAS500.PRSe part 10 and aids in evenly compressing the composite material 76. The part and mandrel is then covered with a gas-permeable "breather" material or pad and then completely enclosed within a sealed flexible vacuum bag 78. A vacuum is drawn on the bag 78 by evacuating the bag 78 through a vacuum probe 80 in a well-known manner. The ambient pressure, then being higher than that inside the vacuum bag 78, compresses the composite material 76 against the mandrel 29. The breather material aids in providing even pressure transfer so that effects of any wrinkles in the vacuum bag 78 will not appear in the finished part. A vacuum source 82 of approximately 25 pounds per square inch is typical.

The internal vacuum source 74 may be maintained separately through the curing process or, in preferred form, may be maintained in common with the external vacuum bag. If completely enclosed, the vacuum source 82 of the external bag 78 will provide the pressure necessary to substitute for the internal vacuum, thereby requiring only one vacuum source. Any leakage of the vacuum pressure within the mandrel 29 at this point would have no effect, since the evacuated mandrel 29 is completely enclosed within an evacuated external bag 78. However, both vacuum sources 74, 82 may be left applied to improve confidence. The part 10 is then heat cured while under this external pressure according to commonly-known methods. The manner of curing the composite materials does not constitute a part of the present invention.

After curing, the vacuum 82 is removed along with all coverings, such as the external vacuum bag 78, over the part 10. The flexible mandrel 29 is then separated from and removed from within the part 10 by releasing the internal vacuum 74 on the mandrel 29. With the vacuum 74 removed, the end plug 48 is removed from the fill opening 42 and the media 68 is removed or moved to allow the elastomeric mandrel 29 to be collapsed and removed from the cured part 10. With proper use of a parting agent, as described above, the silicone material of the mandrel 29 is easily separated from the internal surfaces of the part 10. In a particularly complex part or one in which there is limited access or a single removal opening, a slight internal vacuum may be applied to the mandrel 29 after at least partial removal of the media 68 in order to collapse and shrink the flexible mandrel 29 away from the part 10. This, however, will not necessarily be required in every case.

The fill media 68 and reinforcement 70, if any, can be completely removed from the mandrel 29 prior to its separation from the finished part 10. Alternatively, the mandrel 29 can be provided with one or more reservoirs, such as provided by the extension sleeve portion 44, to which some or all of the media can be displaced. This will allow the elastomeric mandrel to again become sufficiently flexible to be collapsed and pulled through the remaining opening 12 of the part 10. In this manner, the system can be completely self contained, thereby avoiding spillage of media 68, and providing a confidence that each system contains an optimal volume of media 68 for use. If, on the other hand, it is desired to completely remove the media 68 from the mandrel 29 after each use, there is no need for an extended sleeve portion 44, except as necessary to provide a clamping area for securing the end plug 48 on a portion of the mandrel 29 which is not covered with composite material 76. After the mandrel has been separated from the finished part 10, the part 10 can be trimmed and finished in the usual manner. As described above, due to the non-porous and non-moisture carrying nature of the elastomeric material, an exceptionally smooth interior surface of the finished part 10 is provided and resin sloshing of the finished part may be eliminated.

The above-described elastomeric mandrel 29 made from the preferred silicone compound is durable and has sufficient heat resistance to withstand many uses through a heated cure cycle. Many variations may be made to the above-described methods and equipment used in conjunction with these methods, including some variation in the sequence in which steps are performed, without departing from the spirit and scope of the present invention. Therefore, patent protection is not to be limited by the above descriptions of preferred modes for practicing the invention or by the illustrated equipment, but rather by the following appended claim or claims as interpreted by accepted doctrines of claim interpretation, including the doctrine of equivalents.

What is claimed is:

1. A method of making a flexible mandrel for use in formation of parts from composite materials, said method comprising the steps of:

providing a separable mold with an interior chamber shaped to provide a desired exterior mandrel size and shape;

applying uncured elastomeric material to surfaces of the interior chamber of separated parts of the mold;

joining said elastomeric material by assembling said mold parts prior to cure such that said material joins at seams;

allowing said elastomeric material to cure into a shape of the desired flexible mandrel; and providing a fill opening such that said mandrel is fillable with a particulate solid media and evacuable to compact said media.

2. The method of claim 1, further comprising the step of providing a closure member sized to close said fill opening and including an evacuation port therein.

3. The method of claim 2, wherein said mandrel includes at said fill opening an area at which said closure member is attachable.

4. The method of claim 3, further comprising the step of providing a reservoir operably connected with said mandrel from which said media may be moved to fill said mandrel and to which said media may be moved from said mandrel.

5. The method according to claim 1, further comprising the step of providing a reservoir operatively connected with said mandrel from which media can be moved to fill said mandrel and to which media can be moved from said mandrel.

6. The method of claim 1, further comprising the step of providing an elongated rigid reinforcement means within said mandrel for providing increased longitudinal rigidity.

7. The method of claim 6, wherein said reinforcement means is sized and positioned to displace a significant portion of said media such that the volume of particulate media required to fill said mandrel is substantially reduce.

8. The method of claim 1, further comprising the step of providing a sealing flange means on said mandrel for providing a vacuum seal within said mold upon subsequent re-introduction of said mandrel into said mold for use.

9. The method of claim 1, wherein said elastomeric material is a sprayable silicone rubber.

10. A method of using a flexiable mandrel comprising the steps of:
providing a hollow elastomeric mandrel with a predetermined exterior size and shape conforming substantially to the desired size and shape of the mandrel in use;
providing said mandrel with a fill opening and an evacuation port;
providing a separable mold having an interior cavity surface sized and shaped to correspond to a desired exterior size and shape of the mandrel in use;
placing said mandrel into said mold;
providing an external vacuum within said mold to draw said mandrel snugly against the mold's interior cavity surface;
filling said mandrel with a particulate solid media through said fill opening;
providing an internal vacuum within said mandrel through said evacuation port to compact said media into a substantially rigid form;
releasing said external vacuum while maintaining said internal vacuum; and
removing said mandrel from said mold for use.

11. The method of claim 10, further comprising the steps of applying uncured composite material to said mandrel and curing said composite materials on said mandrel.

12. The method of claim 11, further comprising the step of separation of said mandrel from said composite material after curing by;
releasing said internal vacuum;
removing at least a portion of said media from said mandrel; and
separating said mandrel from said cured composite material.

13. The method of claim 12, further comprising the step of providing a reservoir operably connected with said mandrel from which media is moved during the step of filling said mandrel and to which media is moved during the step of removing at least a portion of said media.

14. The method of claim 11, wherein the step of curing said composite material includes applying external pressure to said composite material by enclosing said composite material and said mandrel in an evacuated flexible vacuum bag and applying heat to said composite materials.

15. The method of claim 10, further comprising the step of providing an elongated rigid reinforcement means within said mandrel for providing increased longitudinal rigidity prior to compacting said media by application of said internal vacuum.

16. The method of claim 10, further comprising the step of preliminarily compacting said media in said mandrel by applying vibration to said media prior to the step of providing said internal vacuum.

17. The method of claim 10, wherein said separable mold includes an integral vacuum port through which said external vacuum is provided.

18. The method of claim 10, Wherein said separable mold includes a means for vacuum sealing said mold at any mold openings.

19. The method of claim 18, wherein said seal means includes an elastomeric seal between mold parts.

20. The method of claim 18, wherein said seal means includes an elastomeric seal flange on said mandrel at an opening of said mold.

21. The method of claim 18, wherein said separable mold includes an integral vacuum port through which said external vacuum is provided.

* * * * *